Sept. 26, 1933.  R. H. LANGLEY ET AL  1,928,062
PICK-UP ARM
Filed Oct. 4, 1930  2 Sheets-Sheet 2

INVENTOR.
Ralph H. Langley George W. Woeker
BY
ATTORNEY.

Patented Sept. 26, 1933

1,928,062

UNITED STATES PATENT OFFICE 1,928,062

PICK-UP ARM

Ralph H. Langley and George W. Wacker, Cincinnati, Ohio, assignors to The Crosley Radio Corporation, Cincinnati, Ohio, a corporation of Ohio Application October 4, 1930. Serial No. 486,427

8 Claims. (Cl. 274—23)

Our invention relates to pick-up arms in one end of which an electrical pick-up device is mounted, and the other end of which is connected to a suitable swivel so that the arm can swing on a vertical pivot and also on a horizontal pivot.

Pick-up devices for use with sound records must be free to move up and down to follow irregularities of the record surface, and also to permit of changing the needle of the pick-up device. They must also be arranged to swing horizontally across the plane surface of the record, and these two motions require vertical and horizontal bearings on the excellence of which depends the effectiveness of the pick-up arm. If there is any lost motion in the vertical bearing there will be resulting distortions in the operation of the device, and unless the horizontal bearing is quite accurately arranged the pick-up will not follow the low frequency notes of the record, the particular form of defect being that the pick-up needle jumps entirely out of the sound groove upon contacting with the indentations and projections within the groove which are created by low frequency notes.

It is the object of the present invention to improve the horizontal bearing by bringing it down close to the surface of the motor board, and to counterbalance the pick-up arm so that exactly the correct pressure of the needle on the record will result. It is a further object to provide a vertical bearing which is free but has no lost motion whatever, and which avoids the necessity of any stop washers for holding the pick-up arm swivel in place in its bearing.

In connection with the counterbalancing of the pick-up arms it is our object to employ a spring which bears against the swivel and the pick-up arm, and because springs are not always the same and do not remain the same in use, we provide an adjustment whereby the correct pressure of the needle on the record can be accurately obtained.

We accomplish our objects by the construction and arrangement of parts of which a typical example, for purposes of illustration, is illustrated and described in detail, and we will set forth in the appended claims the novelty inherent in the construction.

In the drawings:—

Figure 1:
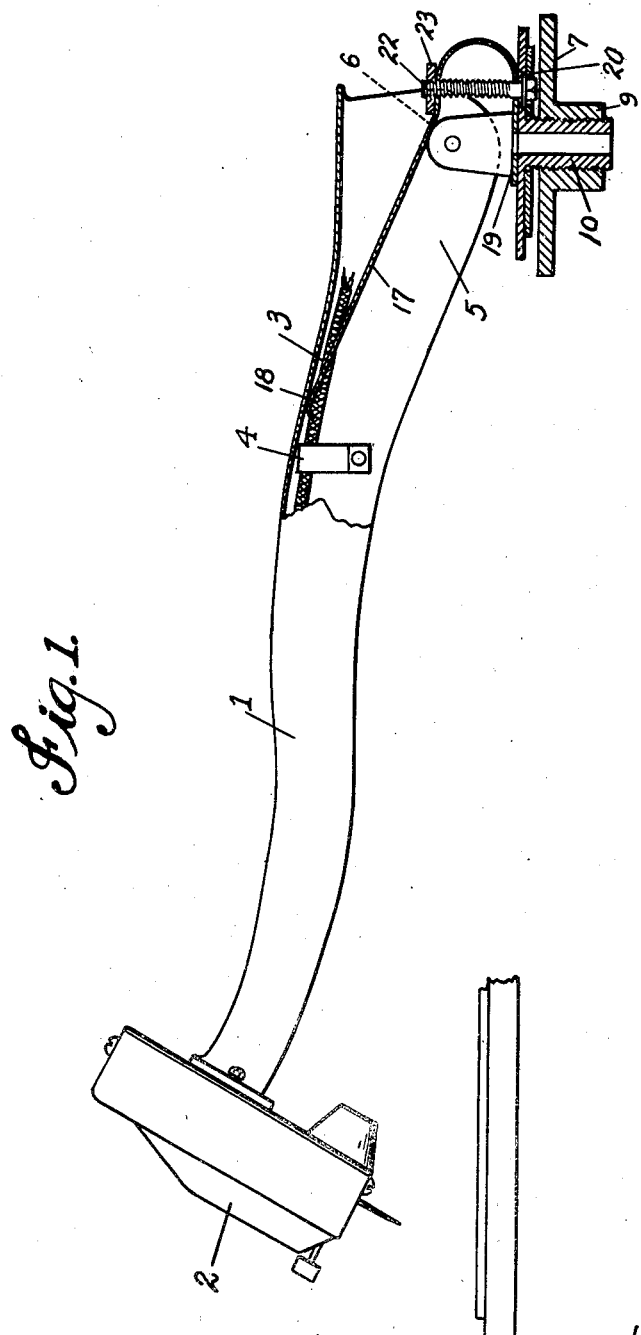
Figure 1 is an assembly view, partly in section, of the novel pick-up arm and mounting.
Figure 2:
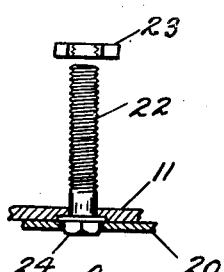
Figure 2 is a detail of the adjusting screw for the pick-up arm spring.
Figure 3:
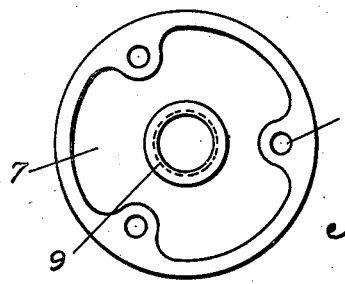
Figure 3 is a plan view of the swivel socket member.
Figure 5:
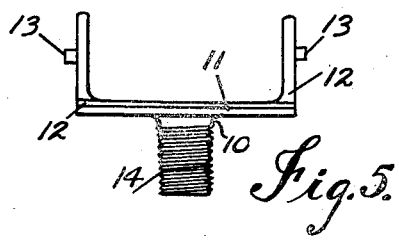
Figure 5 is a side elevation of the swivel.
Figure 7:
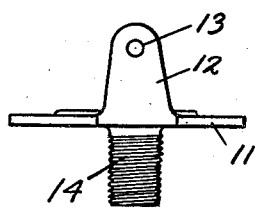
Figure 7 is a side elevation at right angles to Figure 5.
Figure 6:
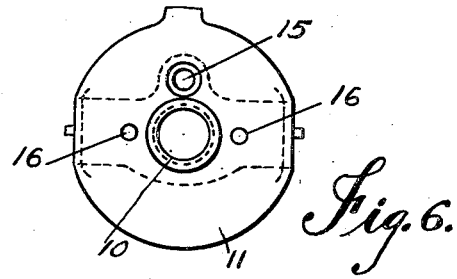
Figure 6 is a bottom plan view thereof.
Figure 8:
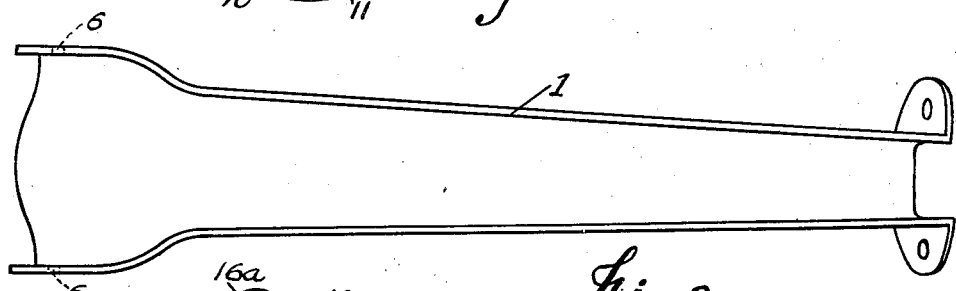
Figure 8 is a bottom plan view of the pick-up arm.
Figure 4:
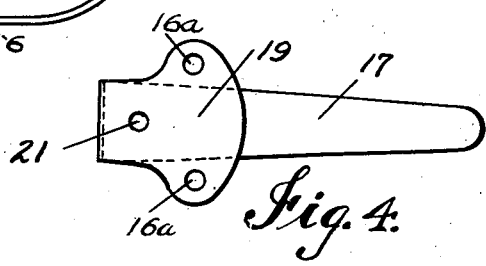
Figure 4 is a bottom plan view of the counterbalancing spring.

The pick-up arm is formed of a piece of sheet metal formed in a U section, and is illustrated at 1, to the outer end of which an electrical pick-up 2 is mounted, the cable of which, as indicated at 3, passes back inside of the arm and is held against displacement or interference by means of a clip 4. The downwardly bent sides of the U-shaped section at the pivoted end of the pick-up arm have greater depth than at the other portions of the same, as indicated at 5, and are perforated with holes 6 for the horizontal pivots.

The motor table of the mechanism is equipped with a swivel socket comprising a plate 7 having holes 8 whereby it is secured to the motor table, and having a depending socket or boss member 9 which is accurately threaded internally with a fine pitched thread. The swiveled member itself comprises a plate 11 having a depending shank 10. The plate 11 has two upstanding ears 12, 12 on which are formed pivot studs 13, over which ears the tone arm is snapped so that the studs 13 enter holes 6 in the reproducer arm member. The depending shank or swivel post 10 is threaded to fit the thread in the threaded socket 9. The plate 11 has a hole 15 therein for the spring adjustment screw, and holes 16 whereby the spring itself is secured.

The parts so far described are die castings and can be very inexpensively produced with a considerable degree of accuracy.

The spring 17, which is in the form of a leaf spring, engages in the pick-up arm at its outer end 18, and its inner end 19 is formed as a return bend and provided with holes 16a whereby it is riveted to the swivel plate. Passing through the return bent portion and a hole 21 provided for this purpose, is the adjusting screw 22, which has an adjustment nut 23 bearing on the top of the spring. This screw passes through the swivel plate and is held from withdrawal by its head, indicated generally at 24. A washer 20 is placed beneath the swivel plate 11, and may be fastened thereto, using the same rivets for this purpose as are used for mounting the spring. The screw has a square head 24 which is seated in a square hole in the washer 20 secured beneath the plate 11, the washer having a large enough central hole to clear the depending threaded post 10 on the swivel plate. This construction provides against the adjusting screw being lifted up through the swivel plate, and also provides against its revolution, when the adjusting nut 23 is turned. It will be evident that the structure above described is extremely simple, and that play or lost motion in the vertical pivot tends to be eliminated, due to the threaded connection. Tools for cutting very accurately fitting screw threads have been brought to a high state of perfection and are capable of producing close fitting parts at very low cost. The screw threaded arrangement of the swivel not only provides against slack, but at the same time gives a free, smooth operation; and it avoids the necessity of providing any additional member for preventing the pick-up arm from being lifted out of its pivot.

In assembling the parts, the swivel and pick-up arm with its spring and adjusting screw are set in place, and the swivel is then screwed into the socket far enough to bring the device into proper position. The adjustment of the nut 23 on the adjusting screw will be such that the weight of the pick-up and of the arm will, when the arm is in position for playing a record, result in exactly the right pressure, which, for present records and needles, is around 4½ ounces.

Having thus described our invention, what we claim as new and desire to secure by Letters Patent, is:—

1. In a pick-up arm construction, the combination with an arm element, a member to which same is pivoted on a horizontal axis, and a vertical pivot for said member, said pivot formed by a threaded post located in a threaded socket.

2. In a pick-up arm construction, the combination with an arm element, a member to which same is pivoted on a horizontal axis, and a vertical pivot for said member, said pivot formed by a threaded post located in a threaded socket, said socket being fixed and the threaded post depending from the said member.

3. A pick-up arm structure comprising a metal piece bent down at the sides and open at the bottom, and pivots passing through the terminal portions of the said bent down sides.

4. In combination, a swivel to which a pick-up arm is pivoted, a socket plate from which a socket depends, and a post on the swivel to engage said socket, a spring for the pick-up arm, and an adjusting screw for the spring, a washer plate secured to the socket plate, and a square hole in the washer engaging the head of the adjusting screw, said screw passing through the swivel.

5. In a pick-up arm, the combination of the arm, a swivel therefor, said arm pivoted to the swivel and a leaf spring engaging the swivel and the pick-up arm for required counterbalancing of the pick-up arm, said spring being substantially within said arm and means for adjusting the force of said spring.

6. In a pick-up arm, the combination of an arm, a swivel therefor to which the arm is pivoted, a spring playing between the swivel and arm and substantially with said arm, and a threaded post on the swivel, and a threaded socket in which said post engages.

7. In a pick-up arm, the combination of the arm, a swivel therefor, said arm pivoted to the swivel and a spring engaging the swivel and the pick-up arm for required counterbalancing of the pick-up arm, said spring with a return bent portion attached to said swivel formed as a leaf spring having its outer engagement with the pick-up arm at a point widely spaced from its attachment to the swivel.

8. In a pick-up arm, the combination of the arm, a swivel therefor, said arm pivoted to the swivel and a leaf spring engaging the swivel and the pick-up arm for required counterbalancing of the pick-up arm, said leaf spring being rigidly attached to said swivel close to the swivel socket and being substantially within said arm.

RALPH H. LANGLEY.
GEORGE W. WACKER.